(12) United States Patent
Moody et al.

(10) Patent No.: US 8,630,671 B2
(45) Date of Patent: Jan. 14, 2014

(54) SYSTEM AND METHOD FOR MESSAGE NOTIFICATION BASED ON TEXT MODIFICATION

(71) Applicant: Avaya Inc., Basking Ridge, NJ (US)

(72) Inventors: Taryn Moody, Atlantic Highlands, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/914,901

(22) Filed: Jun. 11, 2013

(65) Prior Publication Data

US 2013/0273946 A1 Oct. 17, 2013

Related U.S. Application Data

(60) Division of application No. 12/241,900, filed on Sep. 30, 2008, now Pat. No. 8,463,330, which is a division of application No. 10/894,752, filed on Jul. 20, 2004, now Pat. No. 7,693,553, which is a continuation-in-part of application No. 10/882,042, filed on Jun. 30, 2004, now abandoned.

(51) Int. Cl.
  *H04W 4/00* (2009.01)
(52) U.S. Cl.
  USPC ........ 455/466; 455/415; 455/567; 455/550.1; 455/414.4; 455/412.1; 379/373.01; 379/374.01; 379/375.01; 379/93.03; 379/88.19
(58) Field of Classification Search
  USPC ............. 455/412.1–412.2, 466, 414.4, 550.1, 455/567, 415; 379/373.01–373.03, 379/374.01–374.03, 375.01, 379/207.15–207.16, 93.03, 88.19, 88.21
  See application file for complete search history.

(56) References Cited

U.S. PATENT DOCUMENTS

| | | | |
|---|---|---|---|
| 4,975,694 A | 12/1990 | McLaughlin et al. |
| 5,136,633 A | 8/1992 | Tejada et al. |
| 5,870,458 A | 2/1999 | Pappas et al. |
| 5,870,684 A | 2/1999 | Hoashi et al. |
| 5,926,537 A | 7/1999 | Birze |
| 6,148,213 A | 11/2000 | Bertocci et al. |
| 6,313,735 B1 | 11/2001 | Higuchi |
| 6,341,161 B1 | 1/2002 | Latter et al. |
| 6,366,791 B1 | 4/2002 | Lin et al. |

(Continued)

OTHER PUBLICATIONS

Gary, Erica A., "U.S. Appl. No. 10/882,042, Office Action", Feb. 4, 2009, Publisher: USPTO, published in the US.

(Continued)

*Primary Examiner* — Wayne Cai

(57) ABSTRACT

An apparatus and methods are disclosed for enabling a telecommunications terminal to notify its user of the arrival of a message via an acoustic or visual signal whose properties are based on attributes of the message. A network infrastructure element (e.g., a switch, a private branch exchange [PBX], a server, etc.) receives a message directed to a terminal and sets the values of ringtone properties (e.g., tempo, volume, pitch, rhythm, etc.) based on attributes of an incoming message (e.g., the sender, a priority, a subject, the location from which the message was sent, etc.). In a first illustrative embodiment the network infrastructure element sends the message and the instantiated ringtone to the terminal, while in a second illustrative embodiment the network infrastructure element sends the message and the property values to the terminal, and the terminal plays a locally-stored ringtone in accordance with the property values.

9 Claims, 16 Drawing Sheets

(56) References Cited

U.S. PATENT DOCUMENTS

| | | |
|---|---|---|
| 6,418,330 B1 | 7/2002 | Lee |
| 6,532,477 B1 | 3/2003 | Tang et al. |
| 6,570,983 B1 | 5/2003 | Speeney et al. |
| 6,606,507 B1 | 8/2003 | Fujita |
| 6,618,600 B1 | 9/2003 | Chow et al. |
| 6,658,270 B1 | 12/2003 | Lee |
| 6,675,026 B2 | 1/2004 | Yoon |
| 6,690,955 B1 | 2/2004 | Komiyama |
| 6,718,021 B2 | 4/2004 | Crockett et al. |
| 6,718,186 B2 | 4/2004 | Aoki |
| 6,757,530 B2 | 6/2004 | Rouse et al. |
| 6,937,880 B2 | 8/2005 | Teranishi |
| 6,944,482 B2 | 9/2005 | Engstrom et al. |
| 6,947,728 B2 | 9/2005 | Tagawa et al. |
| 7,177,907 B2 | 2/2007 | Sakata |
| 7,269,504 B2 | 9/2007 | Gardner et al. |
| 7,433,680 B2 | 10/2008 | Jenkins et al. |
| 7,492,888 B2 | 2/2009 | Power et al. |
| 7,826,827 B2 * | 11/2010 | Hull et al. ................. 455/412.2 |
| 2001/0012793 A1 | 8/2001 | Aoki |
| 2001/0018332 A1 * | 8/2001 | Lustila et al. ................. 455/90 |
| 2002/0032020 A1 | 3/2002 | Brown et al. |
| 2002/0045466 A1 | 4/2002 | Teranishi |
| 2002/0077102 A1 | 6/2002 | Achuthan et al. |
| 2002/0136368 A1 | 9/2002 | Aoki et al. |
| 2002/0168964 A1 | 11/2002 | Kraft |
| 2003/0016813 A1 | 1/2003 | Weiner |
| 2003/0039339 A1 | 2/2003 | Luehrig et al. |
| 2003/0109251 A1 | 6/2003 | Fujito et al. |
| 2003/0123620 A1 | 7/2003 | Matsuyama |
| 2003/0133553 A1 | 7/2003 | Khakoo et al. |
| 2003/0153337 A1 | 8/2003 | Ito |
| 2003/0165225 A1 | 9/2003 | Creamer et al. |
| 2003/0198322 A1 | 10/2003 | White, Jr. |
| 2004/0027364 A1 | 2/2004 | Ohtani et al. |
| 2004/0032946 A1 | 2/2004 | Koser et al. |
| 2004/0057570 A1 | 3/2004 | Power et al. |
| 2004/0066932 A1 | 4/2004 | Seligmann |
| 2004/0128353 A1 | 7/2004 | Goodman et al. |
| 2004/0184591 A1 | 9/2004 | Shimomura et al. |
| 2004/0204146 A1 | 10/2004 | Deeds |
| 2004/0204153 A1 | 10/2004 | Benco et al. |
| 2004/0266490 A1 | 12/2004 | Silver |
| 2005/0031106 A1 | 2/2005 | Henderson |
| 2005/0107128 A1 | 5/2005 | Deeds |
| 2005/0114207 A1 * | 5/2005 | Jania ................. 705/14 |
| 2005/0140519 A1 | 6/2005 | Smith |
| 2005/0149622 A1 | 7/2005 | Kirkland et al. |
| 2005/0185785 A1 | 8/2005 | Latter et al. |

OTHER PUBLICATIONS

Huy Q. Phan, "U.S. Appl. No. 10/894,752, Office Action", Nov. 25, 2008, Publisher: USPTO, Published in the US.

Gary, Erika A., "U.S. Appl. No. 10/882,042, Office Action Oct. 13, 2009", Publisher: USPTO, Published in US.

Phan, Huy Q., "U.S. Appl. No. 10/894,752 Notice of Allowance Jul. 13, 2009", Publisher: USPTO, published in US.

Gary, Erika A., "U.S. Appl. No. 10/882,042 Office Action Feb. 4, 2009", Publisher: USPTO, published in US.

Gary, Erika A., "U.S. Appl. No. 10/882,042 Office Action Jan. 6, 2006", Publisher: USPTO, published in US.

Gary, Erika A., "U.S. Appl. No. 10/882,042 Office Action Mar. 10, 2009", Publisher: USPTO, published in US.

Gary, Erika A., "U.S. Appl. No. 10/882,042 Office Action Mar. 13, 2007", Publisher: USPTO, published in US.

Gary, Erika A., "U.S. Appl. No. 10/882,042 Office Action Apr. 22, 2008", Publisher: USPTO, published in US.

Gary, Erika A., "U.S. Appl. No. 10/882,042 Office Action May 9, 2006", Publisher: USPTO, published in US.

Gary, Erika A., "U.S. Appl. No. 10/882,042 Office Action Jul. 9, 2007", Publisher: USPTO, published in US.

Gary, Erika A., "U.S. Appl. No. 10/882,042 Advisory Action Aug. 10, 2006", Publisher: USPTO, published in US.

Gary, Erika A., "U.S. Appl. No. 10/882,042 Office Action Aug. 29, 2006", Publisher: USPTO, published in US.

Phan, Huy Q., "U.S. Appl. No. 10/894,752, filed Oct. 18, 2006", Publisher: USPTO, published in US.

Phan, Huy Q., "U.S. Appl. No. 10/894,752, filed Jun. 29, 2006", Publisher: USPTO, published in US.

Phan, Huy Q., "U.S. Appl. No. 10/894,752, filed Sep. 2, 2008", Publisher: USPTO, published in US.

Gary, Erika A., "U.S. Appl. No. 10/882,042 Office Action". Mar. 30, 2009, Publisher: USPTO, published in US.

Huy Q. Phan, "U.S. Appl. No. 10/894,752 Office Action", dated Mar. 21, 2008, publisher: USPTO.

* cited by examiner

US 8,630,671 B2

SYSTEM AND METHOD FOR MESSAGE NOTIFICATION BASED ON TEXT MODIFICATION

CROSS-REFERENCE TO RELATED APPLICATIONS

This application is a divisional of U.S. patent application Ser. No. 12/241,900, filed Sep. 30, 2008, which is a divisional of U.S. patent application Ser. No. 10/894,752, filed 20 Jul. 2004, now U.S. Pat. No. 7,693,553, issued Apr. 6, 2010, which is a continuation-in-part of U.S. patent application Ser. No. 10/882,042, filed 30 Jun. 2004, now abandoned. The content of these are incorporated by reference in their entireties.

FIELD OF THE INVENTION

The present invention relates to telecommunications in general, and, more particularly, to techniques for intelligently notifying the user of a telecommunications terminal of the arrival of a message.

BACKGROUND OF THE INVENTION

FIG. 1 depicts telecommunications system 100 comprising telecommunications terminal 105 (e.g., a wireless telephone, a wireline telephone, a personal digital assistant [PDA], etc.) and network 120 (e.g., the Public Switched Telephone Network [PSTN], a cellular wireless network, a wireless local-area network, etc.) in accordance with the prior art. Telecommunications terminal 105 is capable of receiving messages (e.g., voice telephone calls, email messages, instant messages [IM], Short Message Service [SMS] messages, Multimedia Message Service [MMS] messages, etc.) from other telecommunications terminals via network 120. When telecommunications terminal 105 receives a message, it notifies the user of the terminal of the arrival of the message by playing a "ringtone" (e.g., a tune, a series of beeps, etc.) via speaker 110 and by displaying visual information (e.g., text, an image, etc.) via display 111. Telecommunications terminal 105 might play a particular ringtone for all incoming messages, or a ringtone that is associated with a category of callers (e.g., a ringtone for business contacts, a ringtone for friends, a ringtone for family members, etc.), or a ringtone that is associated with an individual caller, etc. Similarly, telecommunications terminal 105 might display a text message (e.g., "Incoming Call", "Incoming Call: Mom", "Incoming Call: 555-555-5555", etc.) or an image (e.g., an animated icon of a ringing telephone, a photo of the caller, etc.), or both, to indicate that there is an incoming message.

FIG. 2 depicts an illustrative block diagram of the salient components of network 120 in the prior art. As shown in FIG. 2, network 120 comprises a plurality of network infrastructure elements 201-*i* for i=1 to 4, interconnected as shown. Each network infrastructure element 201-*i* might be a switch, a private branch exchange (PBX), a wireless base station, a wireless switching center, a server, etc., depending on the type and topology of network 120. As will be understood by those skilled in the art, although all network infrastructure elements are denoted by the same prefix 201, element 201-1 might be a switch, while element 201-2 might be a wireless base station, etc. Similarly, the fact that network 120 has four elements 201 in FIG. 2 is merely illustrative; network 120 might have fewer elements or a greater number of elements than that depicted.

SUMMARY OF THE INVENTION

The present invention enables a telecommunications terminal to notify its user of the arrival of a message via an acoustic or visual signal whose properties are based on one or more attributes of the message. In particular, in the illustrative embodiments a network infrastructure element (e.g., a switch, a wireless base station, a server, etc.) that receives a message directed to a telecommunications terminal sets the values of one or more properties of a ringtone (e.g., tempo, volume, pitch, rhythm, etc.) based on one or more attributes of an incoming message (e.g., who the sender of the message is, a priority associated with the message, a subject associated with the message, the semantic content of the message, the location from which the message was sent, etc.). For example, if a telecommunications terminal plays the Beatles song "Hello Goodbye" when a message arrives, the song might be played in a variety of ways, depending on attributes of the message:

at a faster tempo when the message has a high priority,
at a louder volume when the subject of an email contains the word "urgent,"
as a piano version when the caller (i.e., the sender of the message) is pianist Murray Perahia,
with minor-mode instead of major-mode harmonies when the text of an email contains a frowning smiley [i.e., a ":(" character combination],
with a female voice singing instead of a male voice when the caller is Gloria Steinem,
with lyrics sung in French when the call originates from France, or
with a Latin rhythm when the caller is Julio Iglesias.

As will be appreciated by those skilled in the art, modifying the values of properties such as volume and tempo does not change the fundamental identity of the song. In other words, the melody of the song is independent of these properties and thus the song remains recognizable.

In the first illustrative embodiment, when a network infrastructure element receives a message for sending to a telecommunications terminal, the element sends a signal that represents an instance of a ringtone (e.g., an audio clip, a Musical Instrument Digital Interface [MIDI] file, etc.) along with the message. The values of one or more musical properties of the ringtone instance, such as tempo, volume, pitch, rhythm, etc., are established based on one or more attributes of the message (e.g., the identity of the sender, the priority of the message etc.).

In the second illustrative embodiment, the network infrastructure element determines property values for music (e.g., key signature equals C major, metronome marking equals 140 beats per minute, etc.) based on one or more attributes of the message, and sends the property values, but not an instance of a ringtone, to the telecommunications terminal along with the message. The telecommunications terminal then plays a ringtone that is stored at the terminal in accordance with the received property values.

The illustrative embodiments of the present invention similarly establish property values of images (e.g., brightness, size, contrast, resolution, etc.) and of text strings (e.g., font size, font style, color, dynamic behavior such as flashing, etc.) that are displayed to notify the user of an incoming message. For example, when a message with a high priority is received, a text notification might flash or might be rendered in a bold font; a static image might be displayed at a higher brightness; and an animated image might move at a faster speed. As in the case of ringtones, in the first illustrative embodiment the network infrastructure element sends a signal that represents an instance of an image (e.g., a Joint Photographic Experts Group [JPEG] file, a Graphics Interchange Format [GIF] file, etc.) to the telecommunications terminal along with the message. The values of one or more properties of the image instance are established based on one or more attributes of the message (e.g., the identity of the sender, the priority of the message, etc.).

In the second illustrative embodiment, the network infrastructure element determines property values for images (e.g., resolution equals 100 by 120 pixels, saturation equals 90%, etc.) based on one or more attributes of the message, and sends the property values, but not an instance of an image, to the telecommunications terminal along with the message. The telecommunications terminal then displays an image that is stored at the terminal in accordance with the received property values.

For text notifications, both the first and second illustrative embodiments send one or more property values of text with the message (i.e., no text is sent), and the telecommunications terminal displays the appropriate text string in accordance with the received property values.

The illustrative embodiment comprises: (a) receiving at a telecommunications terminal (i) a message, and (ii) a first signal representing an instance of a musical composition; and (b) outputting an acoustic second signal based on said first signal to notify the user of said telecommunications terminal of the arrival of said message; wherein the value of a property of said instance is based on an attribute of said message; and wherein said property is a property of music that is independent of melody.

DETAILED DESCRIPTION

The term appearing below is given the following definition for use in this Description and the appended Claims.

For the purposes of the specification and claims, the term "musical composition" is defined as either a piece of music or a sound effect (e.g., one or more beeps, etc.).

Figure 3:
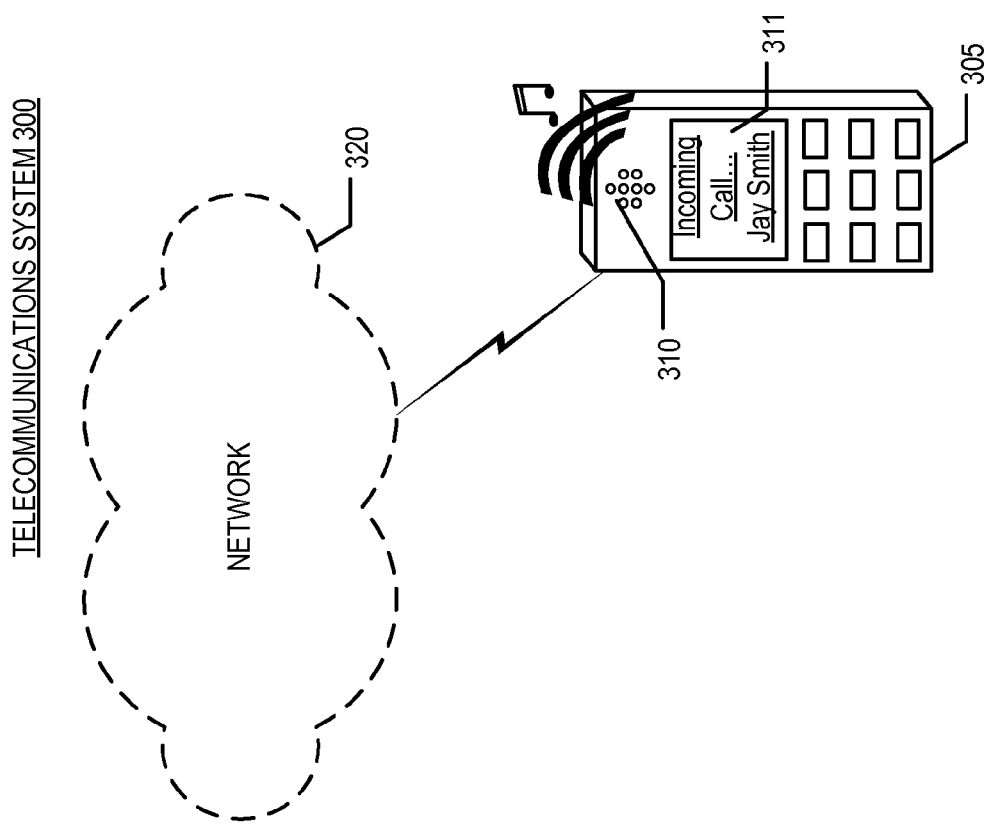
FIG. 3 depicts a telecommunications system in accordance with the illustrative embodiments of the present invention.

FIG. 3 depicts telecommunications system 300 in accordance with the illustrative embodiments of the present invention. As shown in FIG. 3, telecommunications system 300 comprises telecommunications terminal 305 and network 320.

Telecommunications terminal 305 is a wireless telephone, a wireline telephone, a personal digital assistant (PDA), etc. that is capable of receiving messages (e.g., voice telephone calls, email messages, Short Message Service [SMS] messages, etc.) from other telecommunications terminals via network 320, and of notifying its user of the arrival of a message as described below and with respect to FIGS. 11 and 16. As shown in FIG. 3, telecommunications terminal 305 comprises speaker 310 and display 311. Speaker 310, like speaker 110 of telecommunications terminal 105, is capable of generating acoustic signals (e.g., ringtones, etc.) in well-known fashion, and display 311, like display 111 of telecommunications terminal 105, is capable of displaying visual signals (e.g., text, images, etc.) in well-known fashion.

Network 320 is a communications network (e.g., the Public Switched Telephone Network [PSTN], a cellular wireless network, a wireless local-area network, etc.) that sends messages to telecommunications terminal 305 as described below and with respect to FIGS. 7 through 10 and FIGS. 12 through 15.

Figure 1:
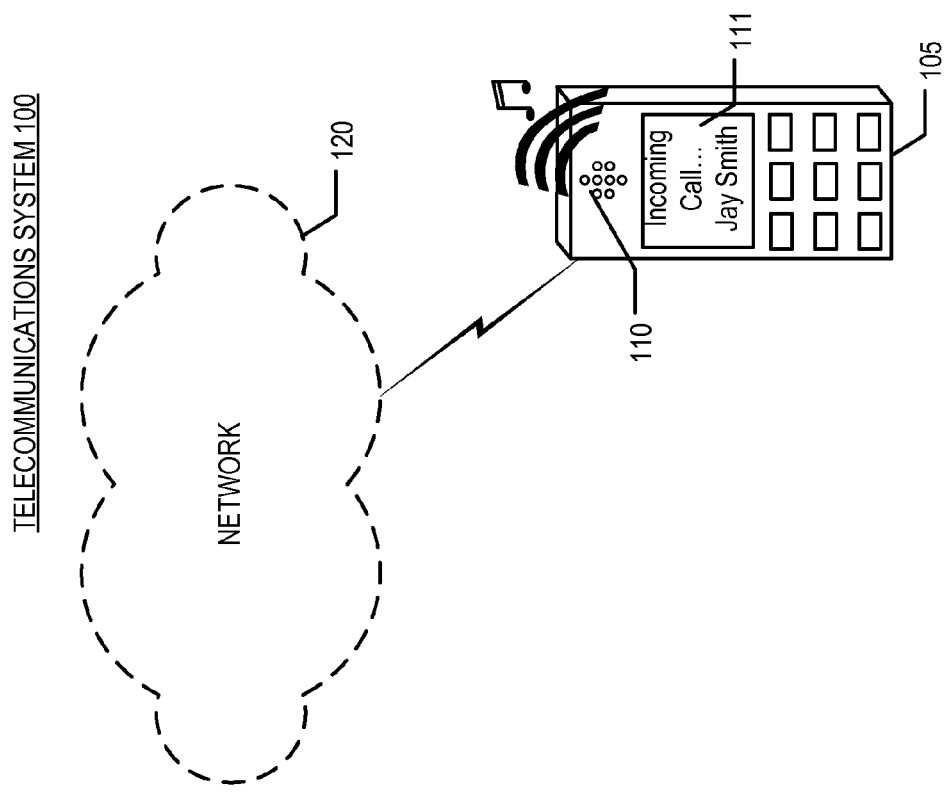
FIG. 1 depicts a telecommunications system in the prior art.
Figure 2:
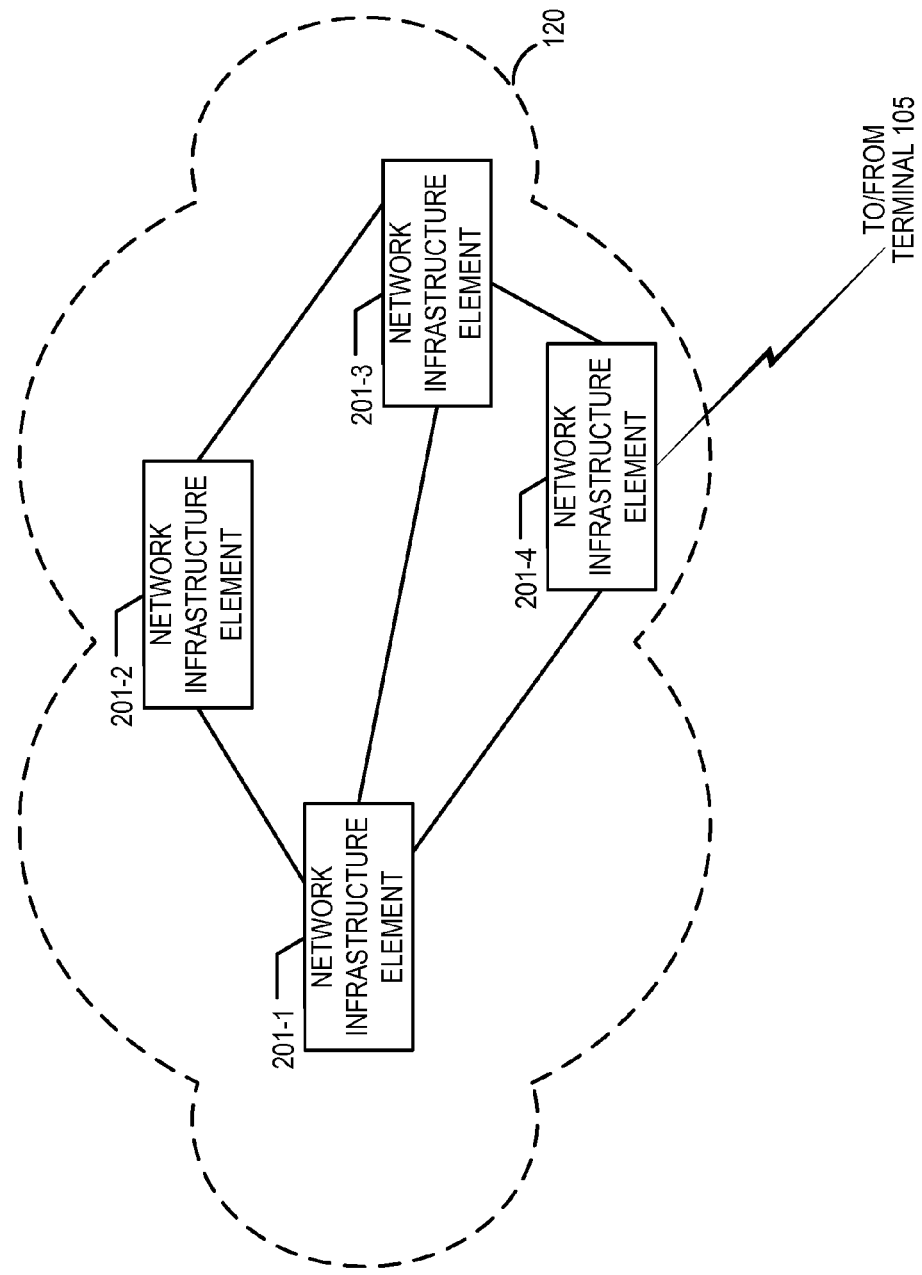
FIG. 2 depicts an illustrative block diagram of the salient components of network 120, as shown in FIG. 1, in the prior art.
Figure 4:
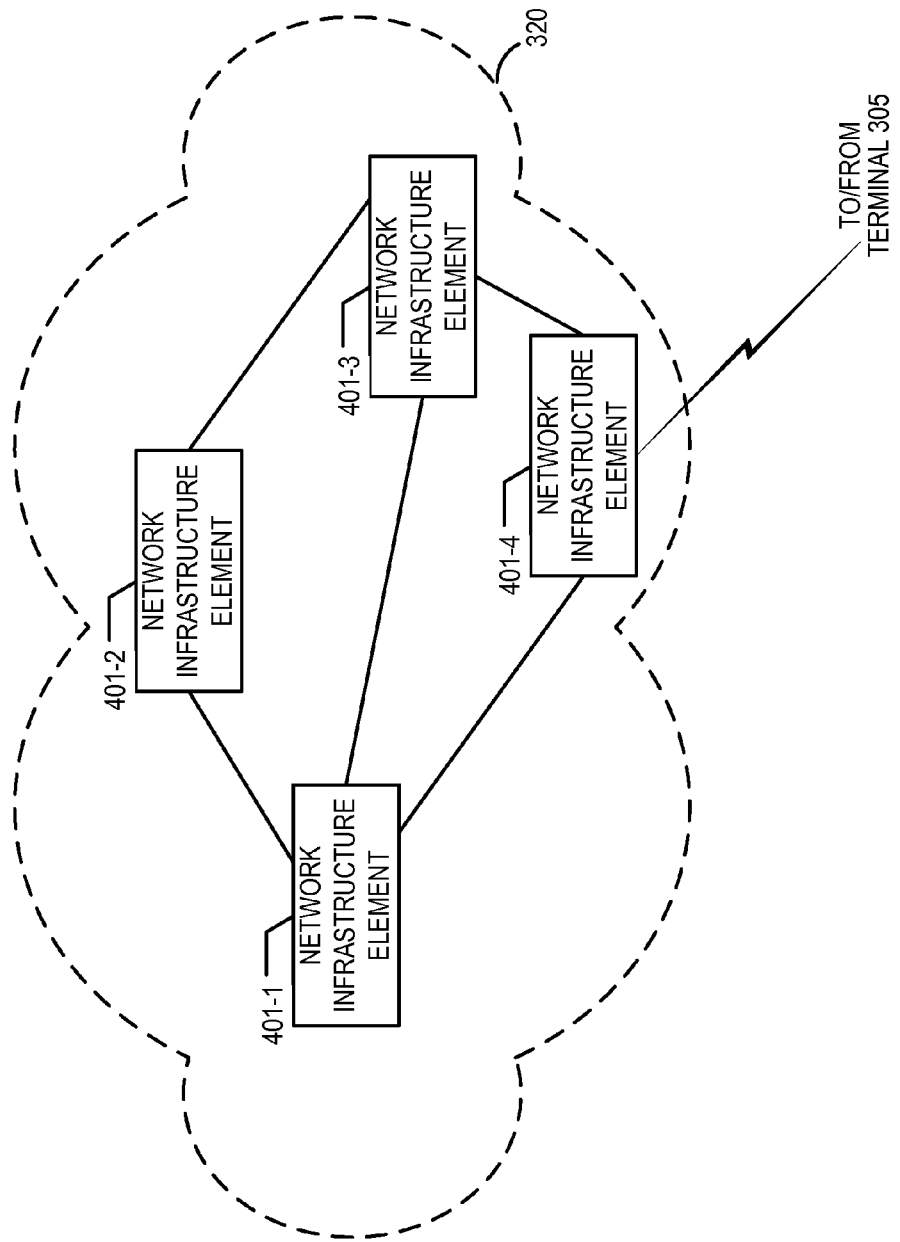
FIG. 4 depicts an illustrative block diagram of the salient components of network 320, as shown in FIG. 3, in accordance with the illustrative embodiments of the present invention.

FIG. 4 depicts an illustrative block diagram of the salient components of network 320 in accordance with the illustrative embodiments of the present invention. As shown in FIG. 4, network 320 comprises a plurality of network infrastructure elements 401-*i* for i=1 to 4, interconnected as shown. Each network infrastructure element 401-*i* (e.g., a switch, a private branch exchange (PBX), a wireless base station, a wireless switching center, a server, etc.) is capable of sending messages to telecommunications terminal 305 (either directly or via one or more other network infrastructure elements 401, depending on what kind of element it is) as described below and with respect to FIGS. 7 through 10 and FIGS. 12 through 15. As in the case of FIG. 2, the fact that FIG. 4 depicts network 320 with four elements 401 is merely illustrative.

Figure 5:
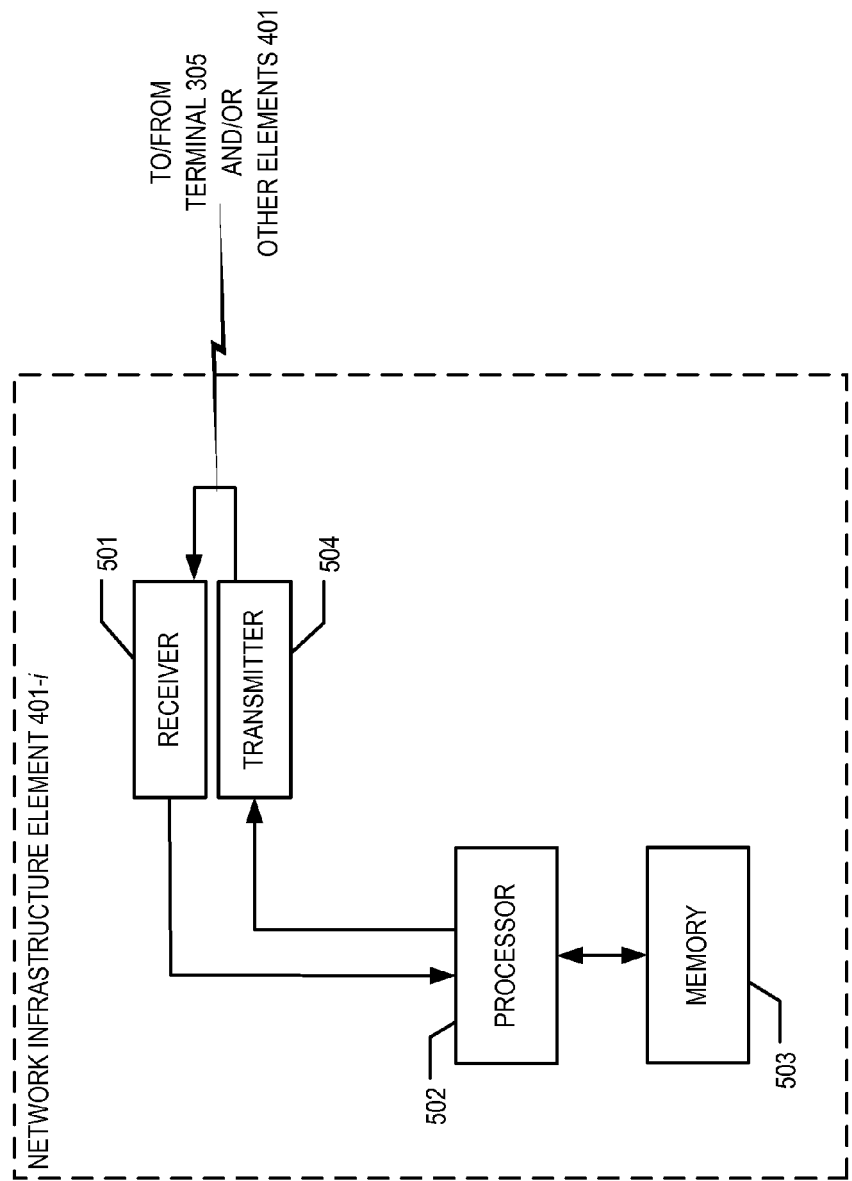
FIG. 5 depicts a block diagram of the salient components of network infrastructure element 401-*i*, as shown in FIG. 4, in accordance with the illustrative embodiments of the present invention.

FIG. 5 depicts a block diagram of the salient components of network infrastructure element 401-*i* in accordance with the illustrative embodiments of the present invention. As shown in FIG. 5, network infrastructure element 401-*i* comprises receiver 501, processor 502, memory 503, and transmitter 504, interconnected as shown.

Receiver 501 receives signals from one or both of telecommunications terminal 305 and other elements 401, depending on the type of element 401-*i* is, and forwards the information encoded in these signals to processor 502 in well-known fashion. It will be clear to those skilled in the art, after reading this disclosure, how to make and use receiver 501.

Processor 502 is a general-purpose processor that is capable of reading data from and writing data into memory 503 and of executing the tasks described below and with respect to FIGS. 7 through 10 and FIGS. 12 through 15. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. It will be clear to those skilled in the art, after reading this disclosure, how to make and use memory 503.

Transmitter 504 receives information from processor 502 and transmits signals that encode this information to one or both of telecommunications terminal 305 and other elements 401, depending on the type of element 401-*i* is, in well-known fashion. It will be clear to those skilled in the art, after reading this disclosure, how to make and use transmitter 504.

Figure 6:
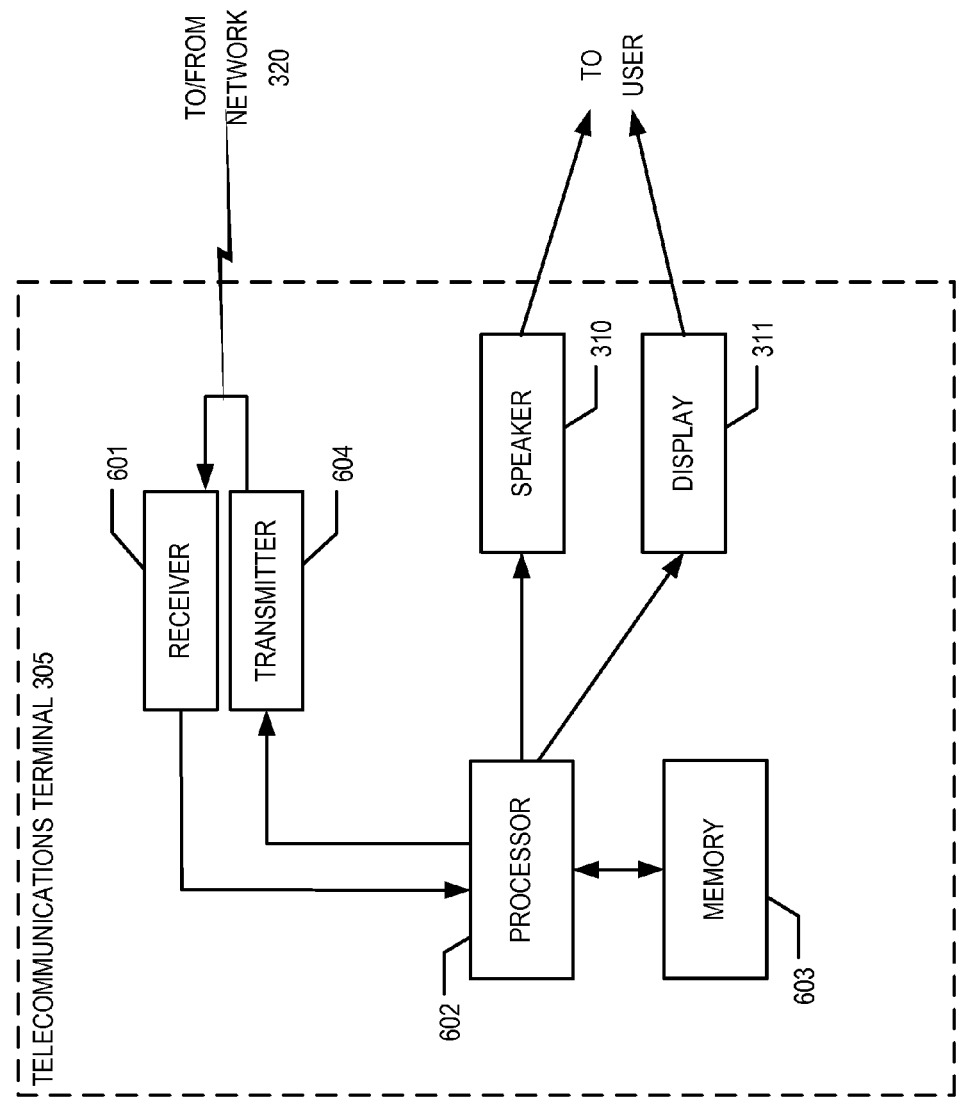
FIG. 6 depicts a block diagram of the salient components of telecommunications terminal 305, as shown in FIG. 3, in accordance with the illustrative embodiments of the present invention.

FIG. 6 depicts a block diagram of the salient components of telecommunications terminal 305, in accordance with the illustrative embodiments of the present invention. As shown in FIG. 6, telecommunications terminal 305 comprises receiver 601, processor 602, memory 603, transmitter 604, speaker 310, and display 311, interconnected as shown.

Receiver 601 is capable of receiving signals sent from network 320 and of forwarding the information encoded in these signals to processor 602, in well-known fashion. It will be clear to those skilled in the art, after reading this disclosure, how to make and use receiver 601.

Processor 602 is a general-purpose processor that is capable of reading data from and writing data into memory 603, of sending signals to speaker 310 and display 311 in well-known fashion, and of executing the tasks described below and with respect to FIGS. 11 and 16. In some alternative embodiments of the present invention, processor 602 might be a special-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc. It will be clear to those skilled in the art, after reading this disclosure, how to make and use memory 603.

Transmitter 604 is capable of receiving information from processor 602 and of transmitting signals that encode this information to network 320 in well-known fashion. It will be clear to those skilled in the art, after reading this disclosure, how to make and use transmitter 604.

Figure 7:
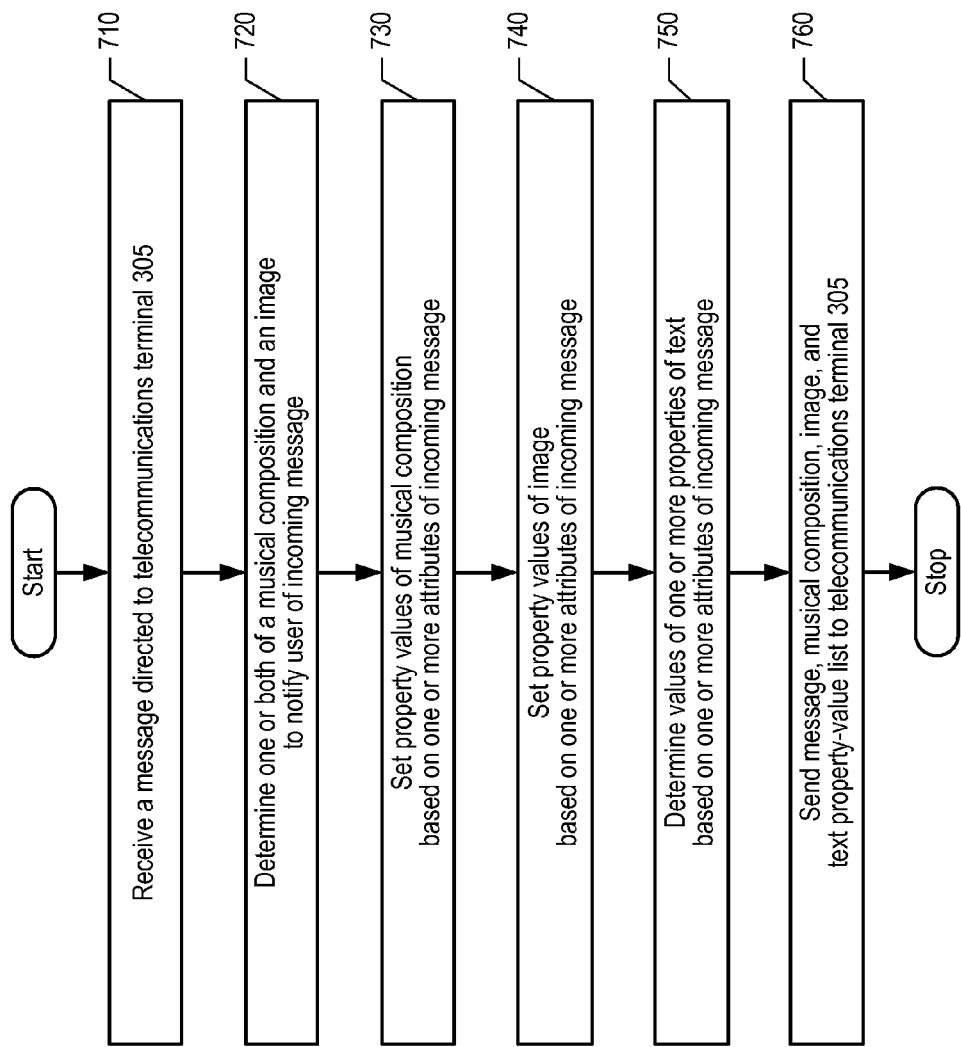
FIG. 7 depicts a flowchart of the salient tasks of network infrastructure element 401-*i*, as shown in FIG. 4, in accordance with the first illustrative embodiment of the present invention.

FIG. 7 depicts a flowchart of the salient tasks of network infrastructure element 401-*i* in accordance with the first illustrative embodiment of the present invention. For any given message sent to telecommunications terminal 305, the method of FIG. 7 need only be performed by one of the network infrastructure elements 401-*i* in the (potentially multi-hop) path from the message sender to telecommunications terminal 305. (For example, the method might be performed only by edge switches, or only by wireless base stations, etc.) It will be clear to those skilled in the art which tasks depicted in FIG. 7 can be performed simultaneously or in a different order than that depicted.

At task 710, receiver 501 of network infrastructure element 401-*i* receives a message directed to telecommunications terminal 305 and forwards the message to processor 502, in well-known fashion.

At task 720, processor 502 determines what musical composition (i.e., ringtone) and/or what image will be used to notify the user of telecommunications terminal 305 of the arrival of the message. In some embodiments the user of telecommunications terminal 305 might be notified via the same musical composition and image for all incoming messages, while in some other embodiments musical compositions and images might be associated with categories of callers, while in still some other embodiments each individual caller might have an associated musical composition and image, etc. As will be appreciated by those skilled in the art, in some embodiments these ringtone and image "rules" might be specified by the user of telecommunications terminal 305 and uploaded to memory 503 of network infrastructure element 401-*i*, while in some other embodiments the calling terminal might automatically piggyback a ringtone and/or image on outgoing messages, etc.

At task 730, processor 502 sets the values of one or more properties of the musical composition that was determined at task 720 based on one or more attributes of the message, as described in detail below and with respect to FIG. 8.

At task 740, processor 502 sets the values of one or more properties of the image that was determined at task 720 based on one or more attributes of the incoming message, as described in detail below and with respect to FIG. 9.

At task 750, processor 502 determines the values of one or more properties of text based on one or more attributes of the incoming message, as described in detail below and with respect to FIG. 10.

At task 760, processor 502 forwards the message, a file comprising the musical composition as "instantiated" at task 730 (e.g., an audio clip, a Musical Instrument Digital Interface [MIDI] file, etc.), the image as instantiated at task 740, and the text property values determined at task 750 to transmitter 504 for sending to telecommunications terminal 305, in well-known fashion. After task 760, the method of FIG. 7 terminates.

Figure 8:
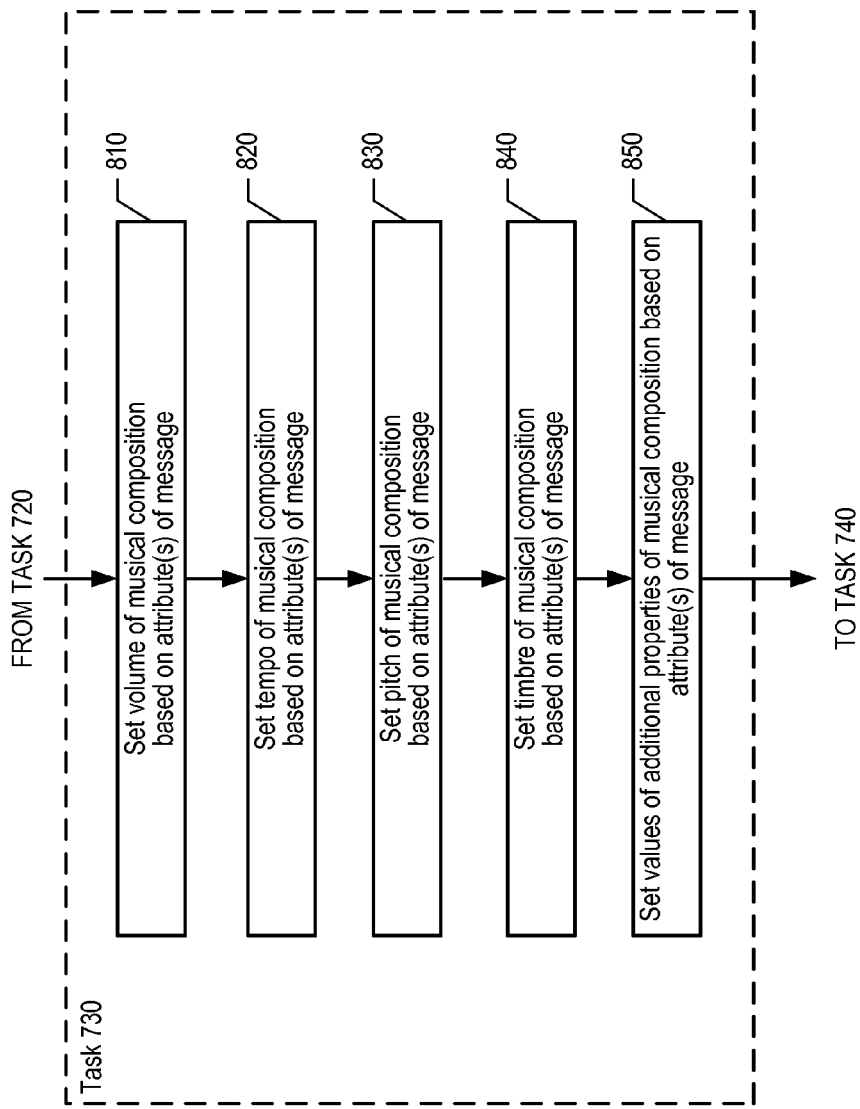
FIG. 8 depicts a detailed flowchart of task 730, as shown in FIG. 7, in accordance with the first illustrative embodiment of the present invention.

FIG. 8 depicts a detailed flowchart of task 730 in accordance with the first illustrative embodiment of the present invention. It will be clear to those skilled in the art which tasks depicted in FIG. 8 can be performed simultaneously or in a different order than that depicted.

At task 810, processor 502 sets the volume of the musical composition based on one or more attributes of the message such as the identity of the sender of the message, a priority associated with the message, a subject associated with the message, the semantic content of the message, the location from which the message was sent (if such information is available), etc. As will be appreciated by those skilled in the art, the logic by which processor 502 sets the volume of the musical composition might be specified by a network service provider, by the user of telecommunications terminal and uploaded to network infrastructure element 401-*i*, etc.

At task 820, processor 502 sets the tempo of the musical composition based on one or more attributes of the message.

At task 830, processor 502 sets the pitch (i.e., key signature) of the musical composition based on one or more attributes of the message.

At task 840, processor 502 sets the timbre (e.g., the musical instrument playing the composition, etc.) of the musical composition based on one or more attributes of the message.

At task 850, processor 502 sets the values of additional properties of the musical composition (e.g., harmony, rhythm, gender for vocal music, language for vocal music, etc.) based on one or more attributes of the message. After task 850, execution continues at task 740.

Figure 9:
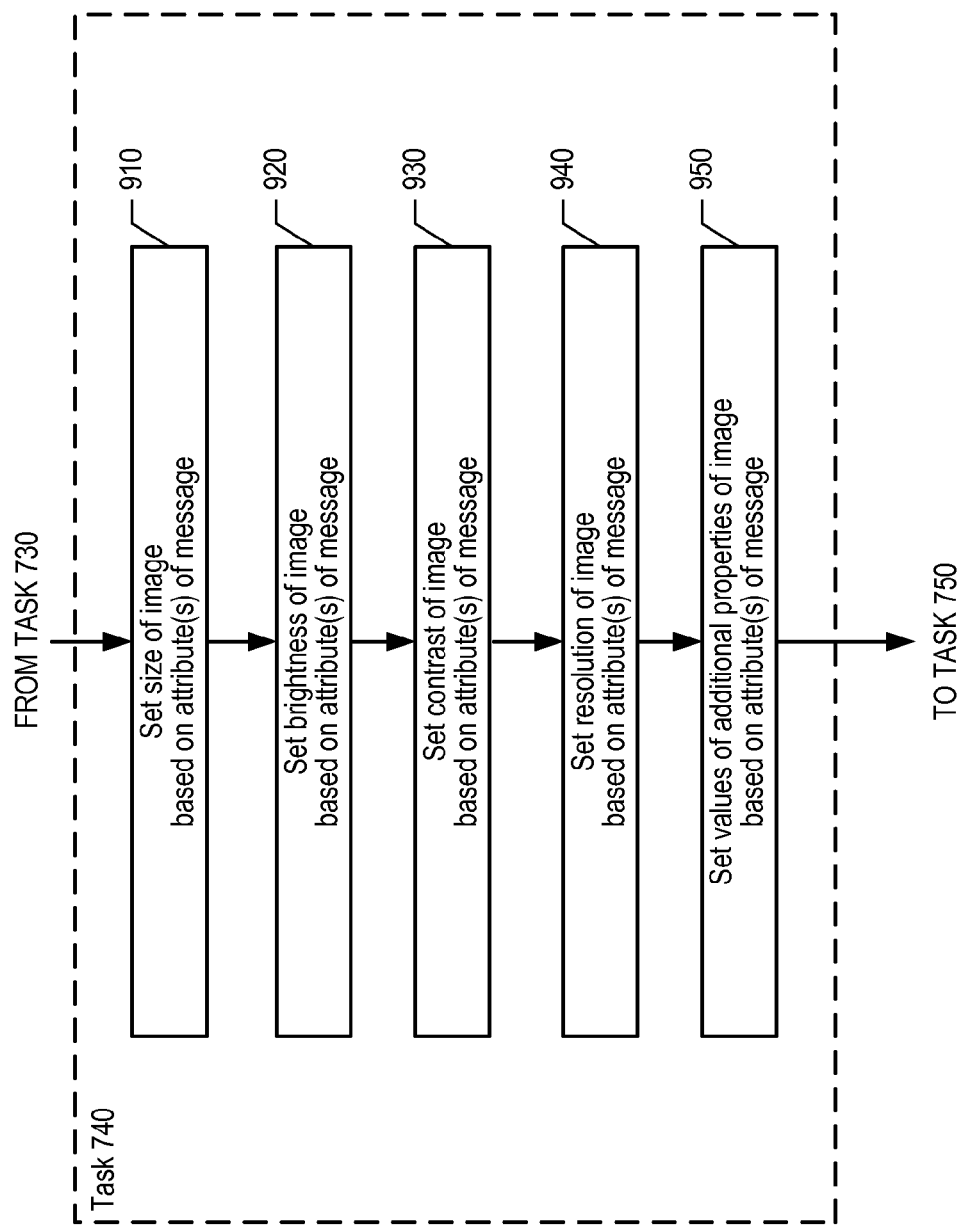
FIG. 9 depicts a detailed flowchart of task 740, as shown in FIG. 7, in accordance with the first illustrative embodiment of the present invention.

FIG. 9 depicts a detailed flowchart of task 740 in accordance with the first illustrative embodiment of the present invention. It will be clear to those skilled in the art which tasks depicted in FIG. 9 can be performed simultaneously or in a different order than that depicted.

At task 910, processor 502 sets the size of the image based on one or more attributes of the message such as the identity of the sender of the message, a priority associated with the message, a subject associated with the message, the semantic content of the message, the location from which the message was sent (if such information is available), etc.

At task 920, processor 502 sets the brightness of the image based on one or more attributes of the message.

At task 930, processor 502 sets the contrast of the image based on one or more attributes of the message.

At task 940, processor 502 sets the resolution of the image based on one or more attributes of the message.

At task 950, processor 502 sets the values of additional properties of the image (e.g., hue, saturation, position on display 311, speed of animation, etc.) based on one or more attributes of the message. After task 950, execution continues at task 750.

Figure 10:
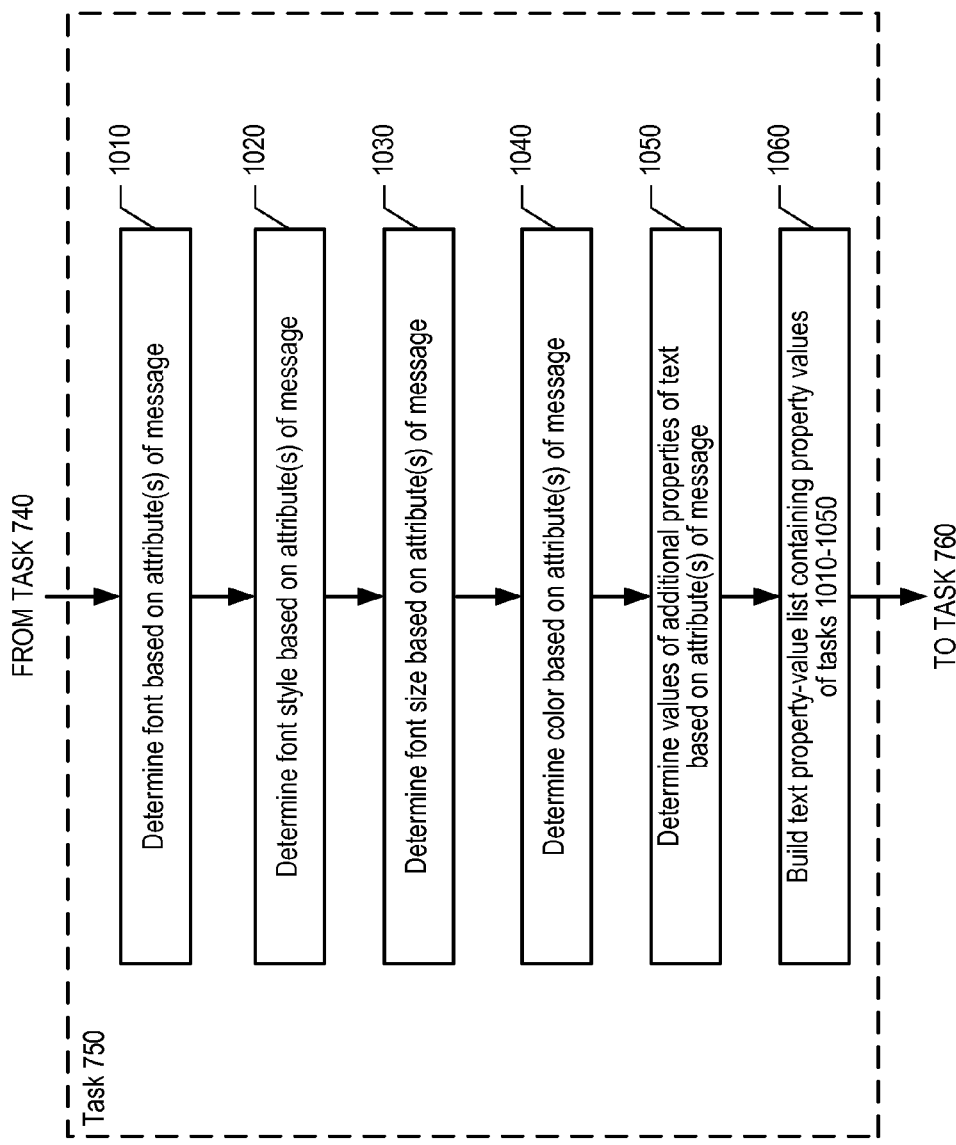
FIG. 10 depicts a detailed flowchart of task 750, as shown in FIG. 7, in accordance with the first illustrative embodiment of the present invention.

FIG. 10 depicts a detailed flowchart of task 750 in accordance with the first illustrative embodiment of the present invention. It will be clear to those skilled in the art which tasks depicted in FIG. 10 can be performed simultaneously or in a different order than that depicted.

At task 1010, processor 502 determines the text font based on one or more attributes of the message such as the identity of the sender of the message, a priority associated with the message, a subject associated with the message, the semantic content of the message, the location from which the message was sent (if such information is available), etc.

At task 1020, processor 502 determines the font style (e.g., bold, italics, etc.) based on one or more attributes of the message.

At task 1030, processor 502 determines the font size based on one or more attributes of the message.

At task 1040, processor 502 determines the text color based on one or more attributes of the message.

At task 1050, processor 502 determines the values of additional properties of the text (e.g., background color, position on display 311, dynamic behavior, speed of dynamic behavior, etc.) based on one or more attributes of the message.

At task 1060, processor 502 builds a text property-value list based on tasks 1010 through 1050, in well-known fashion. After task 1060, execution continues at task 760.

Figure 11:
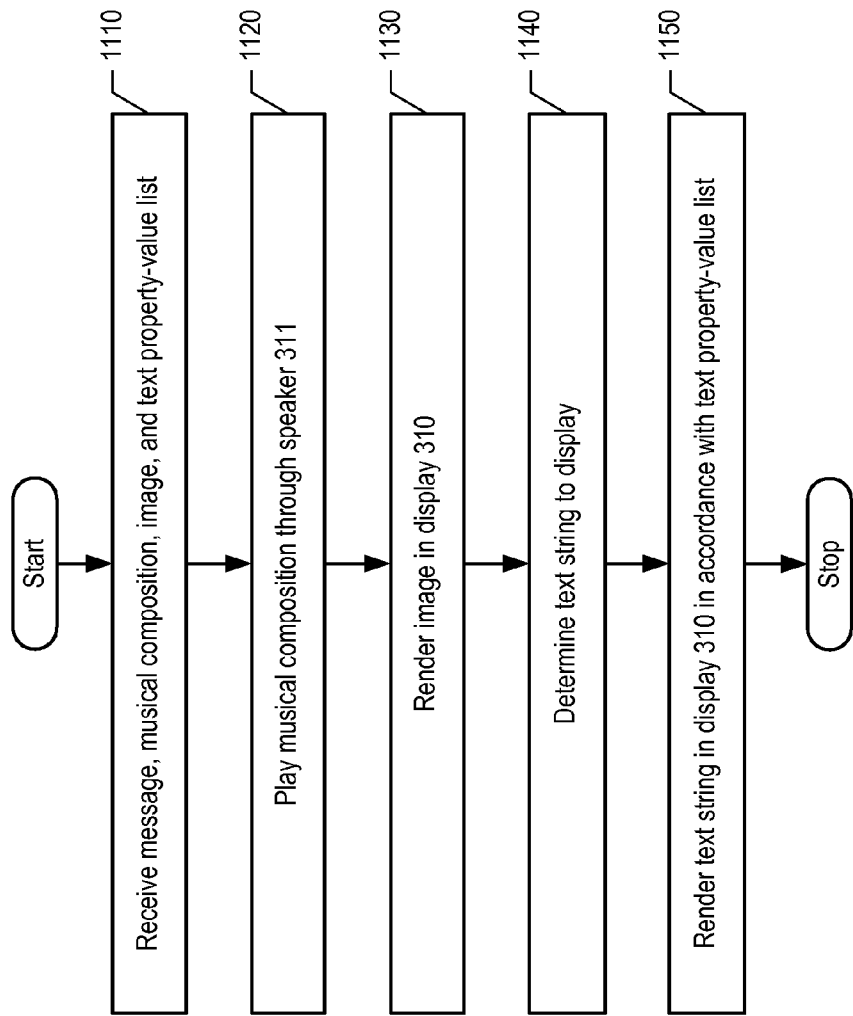
FIG. 11 depicts a flowchart of the salient tasks of telecommunications terminal 305, as shown in FIG. 3, in accordance with the first illustrative embodiment of the present invention.

FIG. 11 depicts a flowchart of the salient tasks of telecommunications terminal 305 in accordance with the first illustrative embodiment of the present invention.

At task 1110, receiver 601 of telecommunications terminal 305 receives a message, a musical composition, an image, and a text property-value list and forwards them to processor 602, in well-known fashion.

At task 1120, telecommunications terminal 305 plays the musical composition through speaker 311, in well-known fashion.

At task 1130, telecommunications terminal 305 renders the image in display 310, in well-known fashion.

At task 1140, telecommunications terminal 305 determines what text string to display to notify its user of the incoming message, in the same fashion as telecommunications terminal 105 in the prior art.

At task 1150, telecommunications terminal 305 renders the text string of task 1140 in display 310 in accordance with the text property-value list received at task 1110, in well-known fashion. After task 1150, the method of FIG. 11 terminates.

Figure 12:
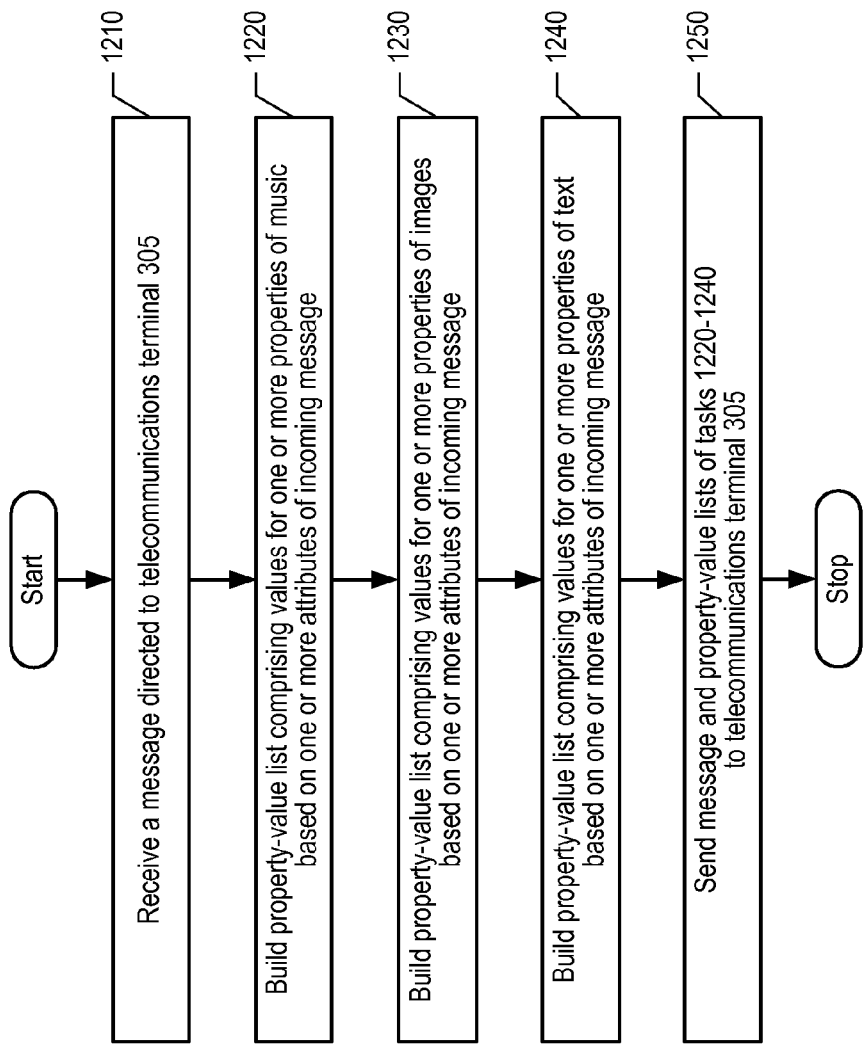
FIG. 12 depicts a flowchart of the salient tasks of network infrastructure element 401-*i*, as shown in FIG. 4, in accordance with the second illustrative embodiment of the present invention.

FIG. 12 depicts a flowchart of the salient tasks of network infrastructure element 401-$i$ in accordance with the second illustrative embodiment of the present invention. In the second illustrative embodiment, network infrastructure element 401-$i$ does not determine which ringtone and/or image is used to notify the user of telecommunications terminal 305. Network infrastructure element 401-$i$ only determines the property values for the ringtone and the image, while telecommunications terminal 305 determines which ringtone (stored locally) to play and which image (stored locally) to display. As in the first illustrative embodiment, network infrastructure element 401-$i$ determines the property values for text used to notify the user of telecommunications terminal 305 of the incoming message, but not the text itself.

In addition, as in the first illustrative embodiment the method of FIG. 12 need only be performed by one of the network infrastructure elements 401-$i$ in the (potentially multi-hop) path from the sender of a message to telecommunications terminal 305. It will be clear to those skilled in the art which tasks depicted in FIG. 12 can be performed simultaneously or in a different order than that depicted.

At task 1210, receiver 501 of network infrastructure element 401-$i$ receives a message directed to telecommunications terminal 305 and forwards the message to processor 502, in well-known fashion.

At task 1220, processor 502 builds a property-value list comprising values for one or more properties of music based on one or more attributes of the message, as described in detail below and with respect to FIG. 13.

At task 1230, processor 502 builds a property-value list comprising values for one or more properties of images based on one or more attributes of the message, as described in detail below and with respect to FIG. 14.

At task 1240, processor 502 builds a property-value list comprising values for one or more properties of text based on one or more attributes of the message, as described in detail below and with respect to FIG. 15.

At task 1250, processor 502 forwards the message and the property-value lists of tasks 1220 through 1240 to transmitter 504 for sending to telecommunications terminal 305, in well-known fashion. After task 1250, the method of FIG. 12 terminates.

Figure 13:
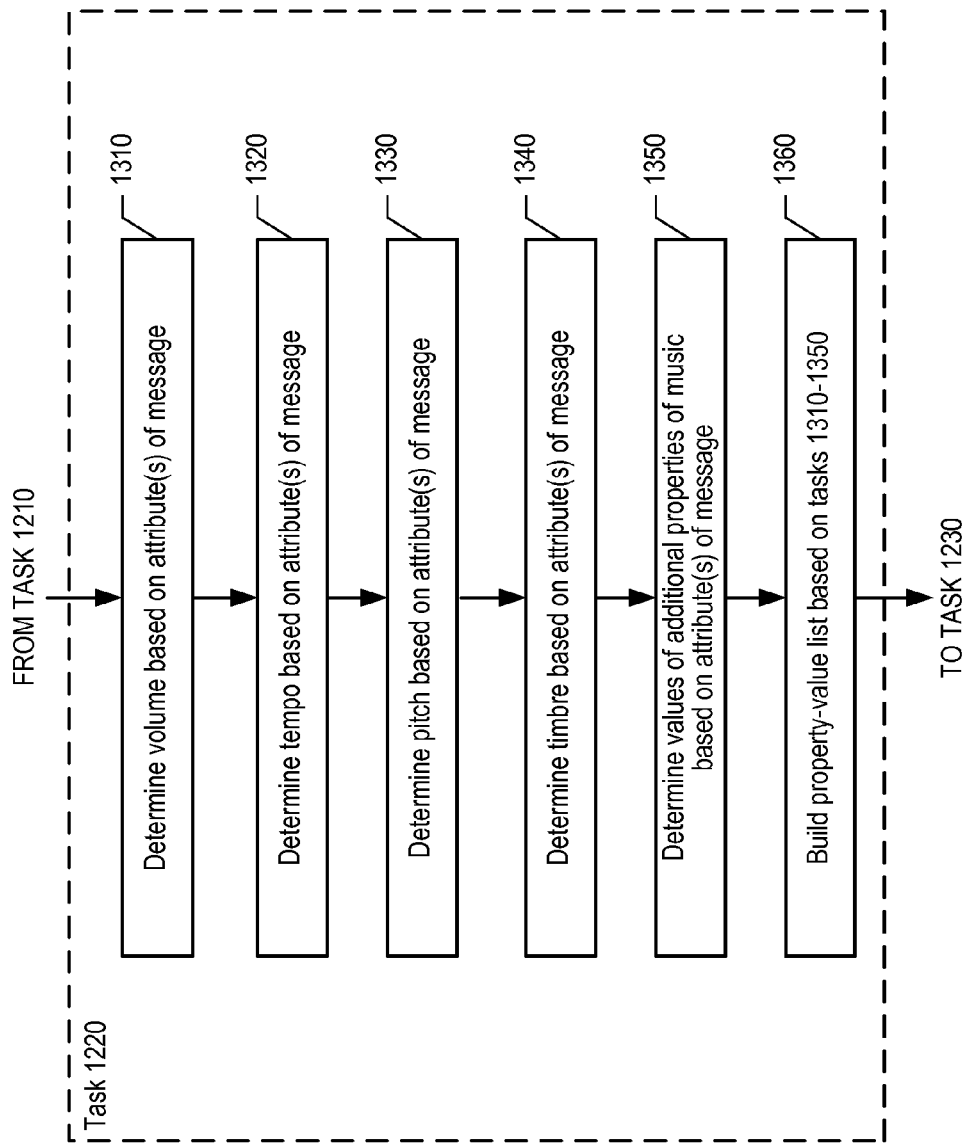
FIG. 13 depicts a detailed flowchart of task 1230, as shown in FIG. 12, in accordance with the second illustrative embodiment of the present invention.

FIG. 13 depicts a detailed flowchart of task 1220 in accordance with the second illustrative embodiment of the present invention. It will be clear to those skilled in the art which tasks depicted in FIG. 13 can be performed simultaneously or in a different order than that depicted.

At task 1310, processor 502 determines volume based on one or more attributes of the message such as the identity of the sender of the message, a priority associated with the message, a subject associated with the message, the semantic content of the message, the location from which the message was sent (if such information is available), etc.

At task 1320, processor 502 determines tempo based on one or more attributes of the message.

At task 1330, processor 502 determines pitch (i.e., key signature) based on one or more attributes of the message.

At task 1340, processor 502 determines timbre (e.g., the musical instrument playing the composition, etc.) based on one or more attributes of the message.

At task 1350, processor 502 determines the values of additional properties of music (e.g., harmony, rhythm, gender for vocal music, language for vocal music, etc.) based on one or more attributes of the message.

At task 1360, processor 502 builds a property-value list based on tasks 1310 through 1350. After task 1360, execution continues at task 1230.

Figure 14:
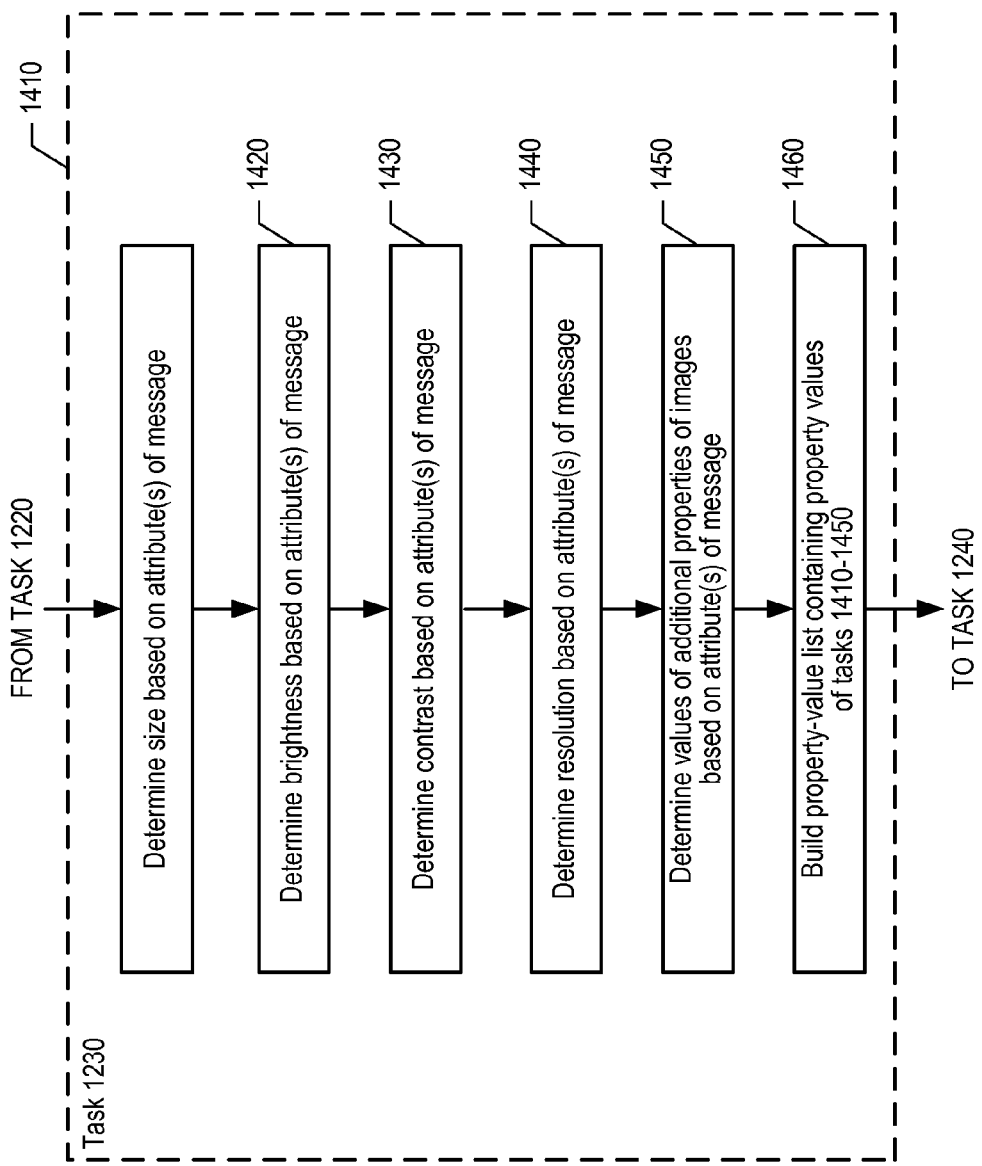
FIG. 14 depicts a detailed flowchart of task 1240, as shown in FIG. 12, in accordance with the second illustrative embodiment of the present invention.

FIG. 14 depicts a detailed flowchart of task 1230 in accordance with the second illustrative embodiment of the present invention. It will be clear to those skilled in the art which tasks depicted in FIG. 9 can be performed simultaneously or in a different order than that depicted.

At task 1410, processor 502 determines image size based on one or more attributes of the message such as the identity of the sender of the message, a priority associated with the message, a subject associated with the message, the semantic content of the message, the location from which the message was sent (if such information is available), etc.

At task 1420, processor 502 determines brightness based on one or more attributes of the message.

At task 1430, processor 502 determines contrast based on one or more attributes of the message.

At task 1440, processor 502 determines resolution based on one or more attributes of the message.

At task 1450, processor 502 determines the values of additional properties of images (e.g., hue, saturation, position on display 311, speed of animation, etc.) based on one or more attributes of the message.

At task 1460, processor 502 builds a property-value list based on tasks 1410 through 1450. After task 1460, execution continues at task 1240.

Figure 15:
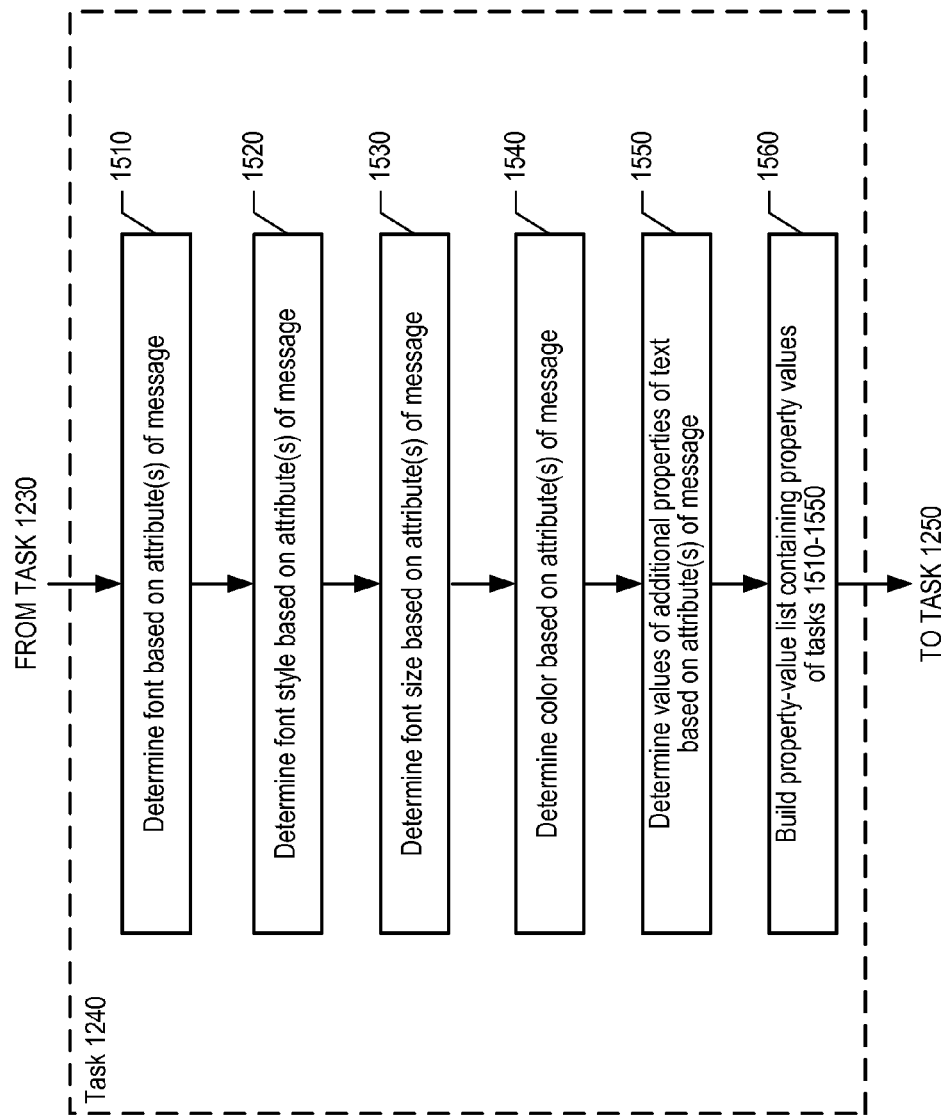
FIG. 15 depicts a detailed flowchart of task 1250, as shown in FIG. 12, in accordance with the second illustrative embodiment of the present invention.

FIG. 15 depicts a detailed flowchart of task 1240 in accordance with the second illustrative embodiment of the present invention. It will be clear to those skilled in the art which tasks depicted in FIG. 15 can be performed simultaneously or in a different order than that depicted.

At task 1510, processor 502 determines the text font based on one or more attributes of the message such as the identity of the sender of the message, a priority associated with the message, a subject associated with the message, the semantic content of the message, the location from which the message was sent (if such information is available), etc.

At task 1520, processor 502 determines the font style (e.g., bold, italics, etc.) based on one or more attributes of the message.

At task 1530, processor 502 determines the font size based on one or more attributes of the message.

At task 1540, processor 502 determines the text color based on one or more attributes of the message.

At task 1550, processor 502 determines the values of additional properties of text (e.g., background color, position on display 311, dynamic behavior, speed of dynamic behavior, etc.) based on one or more attributes of the message.

At task 1560, processor 502 builds a property-value list based on tasks 1510 through 1550, in well-known fashion. After task 1560, execution continues at task 1250.

Figure 16:
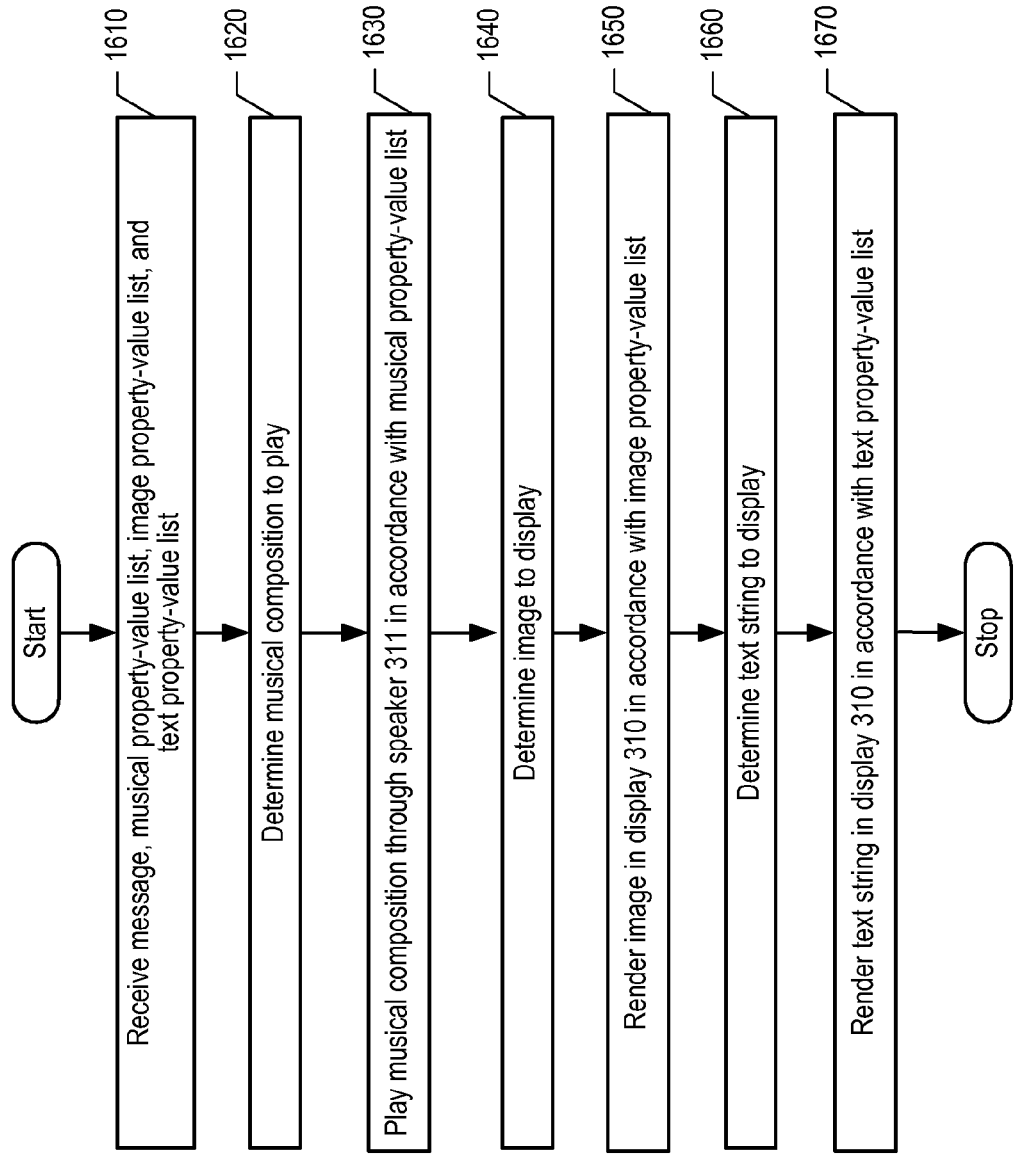
FIG. 16 depicts a flowchart of the salient tasks of telecommunications terminal 305, as shown in FIG. 3, in accordance with the second illustrative embodiment of the present invention.

FIG. 16 depicts a flowchart of the salient tasks of telecommunications terminal 305 in accordance with the second illustrative embodiment of the present invention.

At task 1610, receiver 601 of telecommunications terminal 305 receives a message, a musical property-value list, an image property-value list, and a text property-value list and forwards them to processor 602, in well-known fashion.

At task 1620, processor 602 determines what musical composition to play to notify the user of the arrival of the message, in the same fashion as telecommunications terminal 105 in the prior art.

At task 1630, processor 602 sends a signal to speaker 311 to play the musical composition of task 1620 in accordance with the musical property-value list received at task 1610, in well-known fashion.

At task 1640, processor 602 determines what image to display to notify the user of the arrival of the message, in the same fashion as telecommunications terminal 105 in the prior art.

At task 1650, processor 602 sends a signal to display 310 to render the image of task 1640 in accordance with the image property-value list received at task 1610, in well-known fashion.

At task 1660, processor 602 determines what text string to display to notify the user of the arrival of the message, in the same fashion as telecommunications terminal 105 in the prior art.

At task 1670, processor 602 sends a signal to display 310 to render the text string of task 1660 in accordance with the text property-value list received at task 1610, in well-known fashion. After task 1670, the method of FIG. 16 terminates.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving, at a communications terminal, a message and an indication of a property of a text, wherein the property of the text is one of a font size, a font type, a font style, a position, a brightness value, a text color, a background color, a manner in which an appearance of the text changes, and a speed at which the appearance of the text changes, and wherein the property is associated with an attribute of the message; and displaying, at the communications terminal, a text string as a notification of receipt of the message, wherein the text string is modified based on the indication of the property of the text.

2. The method of claim 1, wherein the font style is one of bold, italicized, underlined, and strike-through.

3. The method of claim 1, wherein the attribute of the message is one of an identity of a sender of the message, a user category associated with the sender of the message, a priority associated with the message, a subject associated with the message, a semantic content of the message, and a location from which the message originates.

4. A system comprising:

a processor; and a computer-readable storage device storing instructions which, when executed by the processor, cause the processor to perform operations comprising:

receiving, at a telecommunications network infrastructure element, a message directed to a communications terminal;

determining, at the telecommunications network infrastructure element, a property of a text based on an attribute of the message, wherein the property of the text is one of a font size, a font type, a font style, a position, a brightness value, a text color, a background color, a manner in which an appearance of the text changes, and a speed at which the appearance of the text changes; and sending, from the telecommunications network infrastructure element, the message and the property of the text to the communications terminal.

5. The system of claim 4, wherein the font style is one of bold, italicized, underlined, and strike-through.

6. The system of claim 4, wherein the attribute of the message is one of an identity of a sender of the message, a user category associated with the sender of the message, a priority associated with the message, a subject associated with the message, a semantic content of the message, and a location from which the message originates.

7. A non-transitory computer-readable storage medium storing instructions which, when executed by a processor, cause the processor to perform operations comprising:

receiving, at a communications terminal, a message and an indication of a property of a text, wherein the indication is associated with the message, wherein the property of the text is one of a font size, a font type, a font style, a position, a brightness value, a text color, a background color, a manner in which an appearance of the text changes, and a speed at which the appearance of the text changes; and displaying, at the communications terminal, a text string as a notification of receipt of the message, wherein a property of the text string is modified based on the indication of the property of the text.

8. The computer-readable storage device of claim 7, wherein the font style is one of bold, italicized, underlined, and strike-through.

9. The computer-readable storage device of claim 7, wherein the attribute of the message is one of an identity of a sender of the message, a user category associated with the sender of the message, a priority associated with the message, a subject associated with the message, a semantic content of the message, and a location from which the message originates.

* * * * *